Sept. 29, 1936.  C. R. BEALL  2,055,811

RAILWAY SIGNALING APPARATUS

Filed June 12, 1934

INVENTOR
Charles R. Beall.
BY
HIS ATTORNEY

Patented Sept. 29, 1936

2,055,811

UNITED STATES PATENT OFFICE 2,055,811

RAILWAY SIGNALING APPARATUS

Charles R. Beall, Edgewood, Pa., assignor to The Union Switch & Signal Company, Swissvale, Pa., a corporation of Pennsylvania Application June 12, 1934, Serial No. 730,209

8 Claims. (Cl. 246—41)

My invention relates to railway signaling apparatus, and particularly to apparatus of the type involving track circuits.

One feature of my invention is the provision, in apparatus of this character, of novel and improved means for varying the voltage of the source of track circuit current in response to variations in the resistance of the ballast, thereby providing substantially constant energization of the track relay under all conditions.

I will describe two forms of apparatus embodying my invention, and will then point out the novel features thereof in claims.

Figure 1:
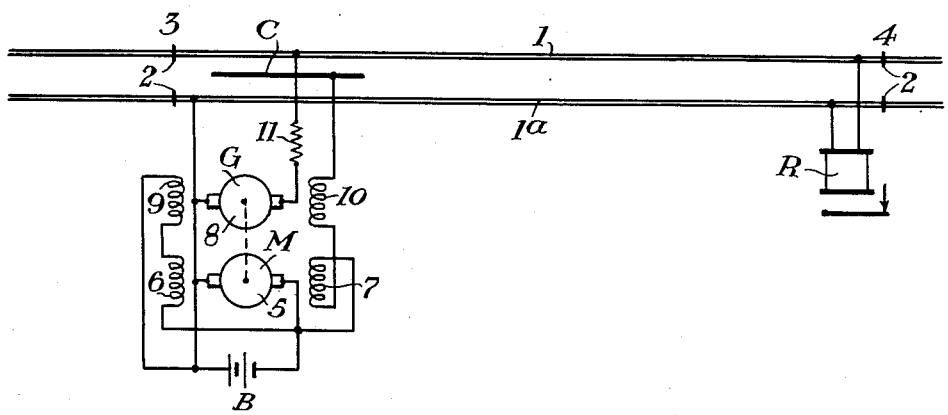
Figure 2:
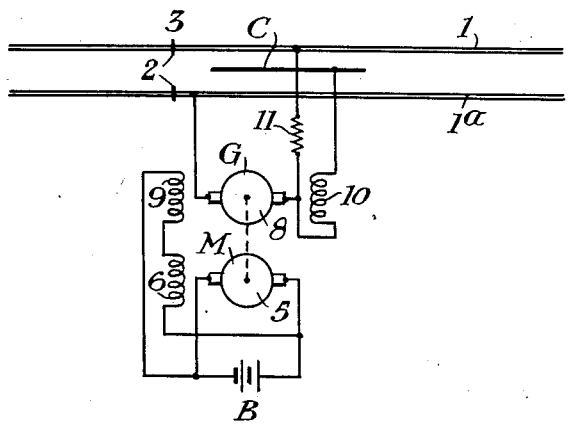

In the accompanying drawing, Fig. 1 is a diagrammatic view showing one form of apparatus embodying my invention. Fig. 2 is a diagrammatic view showing a modification of a portion of the apparatus shown in Fig. 1.

Similar reference characters refer to similar parts in each of the views.

Referring first to Fig. 1, the reference characters 1 and 1a designate the track rails of a stretch of railway track, which rails are divided by insulated joints 2 to form a track section 3—4. Connected across the rails at one end of this section is a track relay R.

Located at the other end of the section is a source of current, which, as here shown, is a battery B. This battery supplies operating current to a motor M comprising an armature 5, a main field winding 6 and an auxiliary field winding 7. The motor M is mechanically connected with a generator G, having an armature 8, a main field winding 9, and an auxiliary field winding 10. The main field windings 6 and 9 are connected in series across the terminals of battery B. The output terminals of generator G are connected with the two track rails 1 and 1a, respectively, the usual current-limiting impedance 11 being interposed between the generator and one of the rails.

The reference character C designates an auxiliary conductor which is in contact with the track ballast. The auxiliary field windings are supplied with current by a regulating circuit which includes two conductors in contact with the track ballast. As here shown, one of these conductors is the lower track rail 1a, and the other is an auxiliary conductor C. The regulating circuit is from the right-hand terminal of battery B, through winding 7, winding 10, conductor C, the ballast between this conductor and rail 1a, and rail 1a to the left-hand terminal of battery B. The amount of current which flows in this circuit will, of course, vary in accordance with variation in the ballast resistance. Winding 7 is so connected in this regulating circuit that it opposes the main field winding 6 of the motor M, but the parts are so proportioned that the effect of winding 7 is always less than that of winding 6. Winding 10 is connected in this regulating circuit in such a manner that it aids the main field winding 9 of generator G.

When the ballast resistance is high, the current flowing in windings 7 and 10 is relatively low, and the parts are so adjusted that under this condition the voltage applied to the track relay R is the normal or desired value. As the ballast resistance decreases, due for example to an increase of moisture, the amount of current supplied to windings 7 and 10 will be increased. As for the motor M, the result will be that the total field energization will be decreased, so that the speed of this motor will increase. As for the generator G, the result of the increase in current in winding 10 will be to increase the total field energization, so that the output voltage will be increased. It follows that as the ballast resistance decreases, the voltage applied to the track rails will increase, thereby maintaining substantially constant the voltage applied to the track relay R. The auxiliary winding 7 on motor M may be omitted, if desired, in which instance the regulation will depend entirely on the variation of field energization of the generator G. Likewise, the auxiliary winding 10 may be omitted, if desired, in which case the regulation will depend entirely on variations in the speed of motor M.

Referring now to Fig. 2, the apparatus is the same as that shown in Fig. 1, except that the speed regulation of motor M is omitted, and the auxiliary winding 10 of generator G is supplied with current from this generator instead of from the battery B. Winding 10 is included in a circuit which passes from the right-hand terminal of generator G, through winding 10, conductor C, the track ballast, and track rail 1a to the left-hand terminal of generator G. As the resistance of the track ballast decreases, the current flowing in winding 10 will increase, thereby increasing the field energization of generator G and so increasing the output voltage of this generator.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a section of railway track, a source of current, a motor receiving current from said source and provided with an auxiliary field winding, a generator driven by said motor and supplying track circuit current to the rails of said section and provided wtih an auxiliary field winding, and a regulating circuit including said source and said two auxiliary windings in series and two spaced conductors in contact with the track ballast, the connections of said circuit being such that the auxiliary motor winding opposes the main motor field winding and that the auxiliary generator winding aids the main generator field winding.

2. In combination, a section of railway track, a source of current, a motor receiving current from said source, a generator driven by said motor and constantly supplying track circuit current to the rails of said section and provided with a separately excited auxiliary field winding, and a regulating circuit including two spaced conductors in contact with the track ballast and said source and said auxiliary generator field winding in series and arranged in such manner that the auxiliary field winding aids the main field winding of the generator.

3. In combination, a section of railway track, a source of current, a motor receiving current from said source, a generator driven by said motor and constantly supplying track circuit current to the rails of said section and provided with a separately excited auxiliary field winding, and a regulating circuit including two spaced conductors in contact with the track ballast and the output terminals of said generator and said auxiliary winding in series and so arranged that the auxiliary winding aids the main field winding of the generator.

4. In combination, a section of railway track, a source of current, a motor receiving current from said source and provided with an auxiliary field winding, a generator driven by said motor and supplying track circuit current to the rails of said section and provided with an auxiliary field winding, an auxiliary conductor in contact with the track ballast, and means responsive to changes in the resistance of the ballast between said conductor and a track rail for supplying current to said auxiliary windings in such directions that the auxiliary motor winding opposes the main motor field winding and the auxiliary generator winding aids the main generator field winding.

5. In combination, a section of railway track, a source of current, a motor receiving current from said source and provided with an auxiliary field winding, a generator driven by said motor and supplying track circuit current to the rails of said section and provided with an auxiliary field winding, and means responsive to changes in ballast resistance for supplying current to said auxiliary windings in such directions that the auxiliary motor winding opposes the main motor field winding and the auxiliary generator winding aids the main generator field winding.

6. In combination, a section of railroad track, a generator for supplying track circuit current to the rails of said section and provided with an auxiliary field winding, an auxiliary conductor in contact with the track ballast, and a regulating circuit connected across said conductor and a track rail and including the output terminals of said generator and said auxiliary winding, and so arranged that the auxiliary winding aids the main field winding of the generator.

7. In combination, a section of railway track, a source of current, a generator constantly connected with the rails of said section for supplying track circuit current to said rails and provided with a cumulative auxiliary field winding, and means including a ballast conductor for passing a current from said source through said auxiliary winding for increasing the output of said generator when the track ballast resistance decreases.

8. In combination, a section of railway track, a source of current, a generator constantly connected with the rails of said section for supplying track circuit current to said rails and provided with a cumulative auxiliary field winding, and means controlled in accordance with changes in ballast resistance for passing a current from said source through said auxiliary winding for increasing the output of said generator when the track ballast resistance decreases.

CHARLES R. BEALL.